United States Patent [19]

Mangogna

[11] Patent Number: 4,556,191
[45] Date of Patent: Dec. 3, 1985

[54] MOLD FOR THE MANUFACTURE OF SHOE SOLES

[76] Inventor: Joseph V. Mangogna, 3316 Bendick, St. Louis, Mo. 63139

[21] Appl. No.: 482,718

[22] Filed: Apr. 7, 1983

[51] Int. Cl.[4] ............................................. B29C 1/00
[52] U.S. Cl. .................................. 249/119; 249/126; 249/171
[58] Field of Search ............... 249/117, 122, 124, 126, 249/135, 137, 170, 119, 123, 102, 171; 425/129 S, 183, 576; 206/373; 220/329, 333

[56] References Cited

U.S. PATENT DOCUMENTS

| | | | |
|---|---|---|---|
| 170,975 | 12/1875 | Wetmore | 249/171 |
| 954,368 | 4/1910 | Allison | 249/170 |
| 1,470,166 | 10/1923 | Holland | 206/373 |
| 1,493,911 | 5/1924 | Washburn | 249/170 |
| 1,596,347 | 8/1926 | Gilowitz | 425/195 |
| 1,698,836 | 1/1929 | Bartley et al. | 249/170 |
| 1,702,051 | 2/1929 | Grondahl | 249/119 |
| 3,171,163 | 2/1965 | Ford et al. | 249/170 |
| 3,200,438 | 8/1965 | McIlvin | 425/145 |
| 3,302,243 | 2/1967 | Ludwig | 425/576 |
| 3,342,624 | 9/1967 | Kamborian | 264/244 |
| 3,799,494 | 3/1974 | McLean | 249/119 |
| 3,813,201 | 5/1974 | Frederick et al. | 425/129 S |
| 3,873,257 | 3/1975 | Vanotti | 425/576 |
| 4,162,879 | 7/1979 | Makowski | 425/183 |

FOREIGN PATENT DOCUMENTS 417927  2/1967  Switzerland .................... 249/170

Primary Examiner—Willard E. Hoag
Attorney, Agent, or Firm—Birch, Stewart, Kolasch & Birch

[57] ABSTRACT

A shoe mold device having a base mold portion containing a cavity and a top mold portion with two or more mold surfaces and rotatably associated with the base mold portion. A shoe sole comprised of a plurality of different colored or shaped layers is manufactured using the mold by successively utilizing different mold surfaces of the top mold portion to contact and close the cavity in the base mold portion.

2 Claims, 10 Drawing Figures

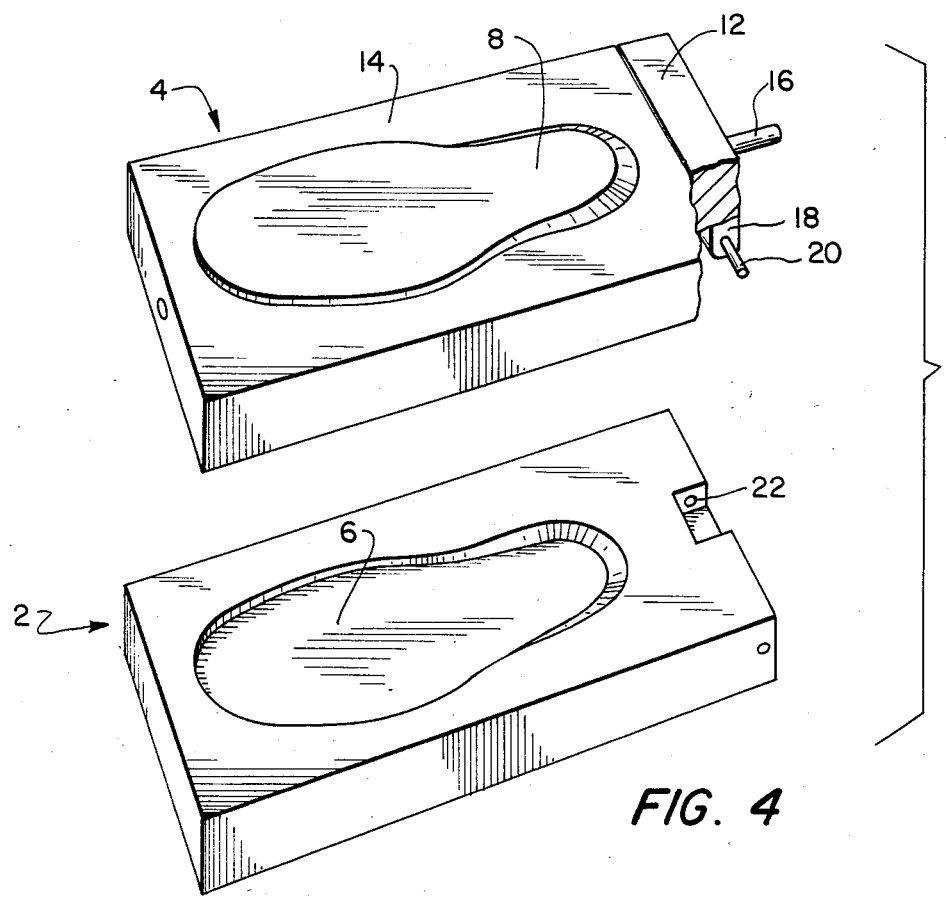
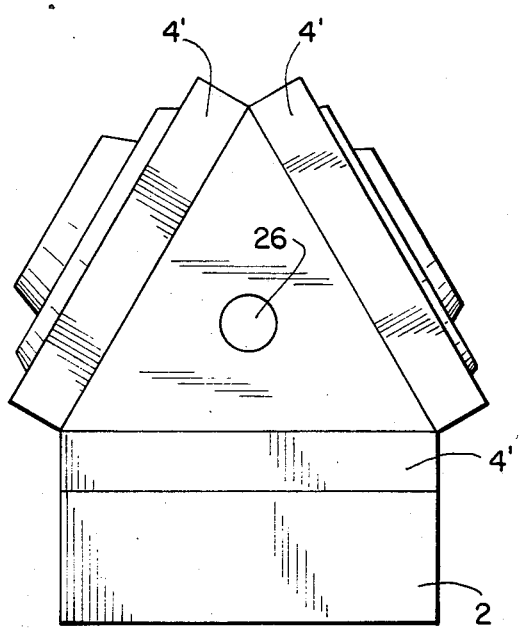

MOLD FOR THE MANUFACTURE OF SHOE SOLES

BACKGROUND AND FIELD OF THE INVENTION

The present invention is directed to a shoe mold device comprised of an upper and a lower mold portion wherein the upper mold portion is rotatable and includes a plurality of mold sides which can be closed against the bottom mold portion. The shoe mold device of the invention permits the manufacture of shoe soles which have a plurality of layers which vary in color or composition.

There has recently been an increase in the popularity of shoe soles which are comprised of a plurality of layers wherein the layers of sole material are manufactured in such a way so as to provide a particular desired visual effect. For example, shoe soles having various different tread designs and thicknesses are very popular in the shoe retail market. Shoes having soles comprised of different colored layers or of layers which vary in thickness are also known. In addition, it is sometimes desirable to vary the composition of the various sole layers in order to provide, for example, an outermost layer which is wear-resistant together with innermost layers which are softer and more comfortable to the wearer.

Presently existing manufacturing techniques for making shoe soles of a plurality of layers generally require numerous stations and substantial manufacturing plant space. In these systems, the shoe sole in manufacture is transported from station to station whereby each individual station performs a separate manufacturing step. These types of devices however besides requiring substantial amounts of manufacturing plant space also require increased manufacturing and labor costs.

OBJECTS AND SUMMARY OF THE INVENTION

It is therefore one object of the present invention to provide a shoe mold device wherein a shoe sole comprised of a plurality of different layers can be manufactured at a single manufacturing station.

It is another object of the present invention to provide a shoe mold device capable of manufacturing shoe soles of different layers in a rapid and easy manner.

It is still another object of the present invention to provide a shoe mold device which can be easily varied in order to be adaptable for manufacture of different types of shoe soles.

It is a further object of the present invention to provide a shoe mold device capable of preparing two different shoe soles at a single station in a rapid fashion.

It is still a further object of the present invention to provide a shoe mold device which is compact and requires only a small amount of manufacturing plant space.

These and further objects of the present invention are accomplished by providing a shoe mold having a base mold portion and a top mold portion wherein the top mold portion includes two or more mold surfaces and is rotatably associated with the base mold portion. A shoe sole comprised of a plurality of different layers is manufactured using the mold by successively utilizing different mold surfaces of the top mold portion to contact and close the base mold portion.

BRIEF DESCRIPTION OF THE DRAWING

FIG. 4 is a side elevational view of the shoe mold device with the upper and lower portions separated.

FIG. 5 is a side elevational view of a second embodiment of the shoe mold device of the invention.

DETAILED DESCRIPTION OF THE INVENTION

Figure 1:
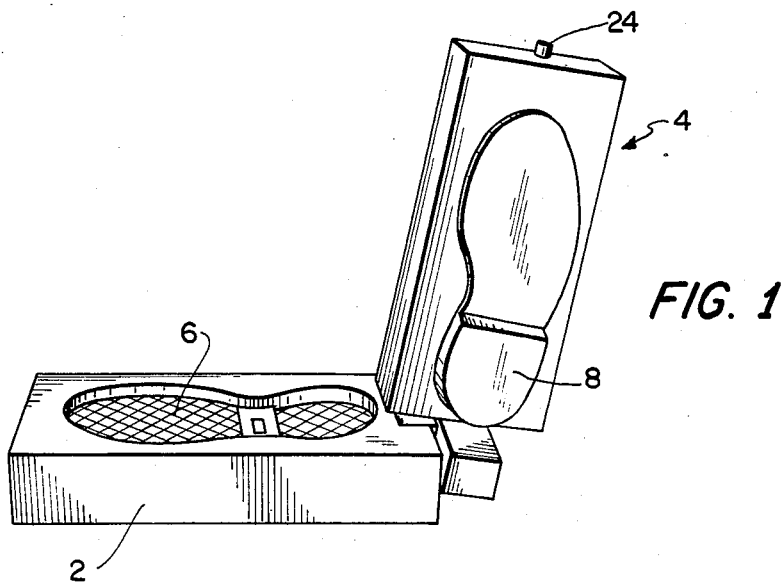
FIG. 1 is a side elevational view of the shoe mold device according to the present invention.
Figure 10:
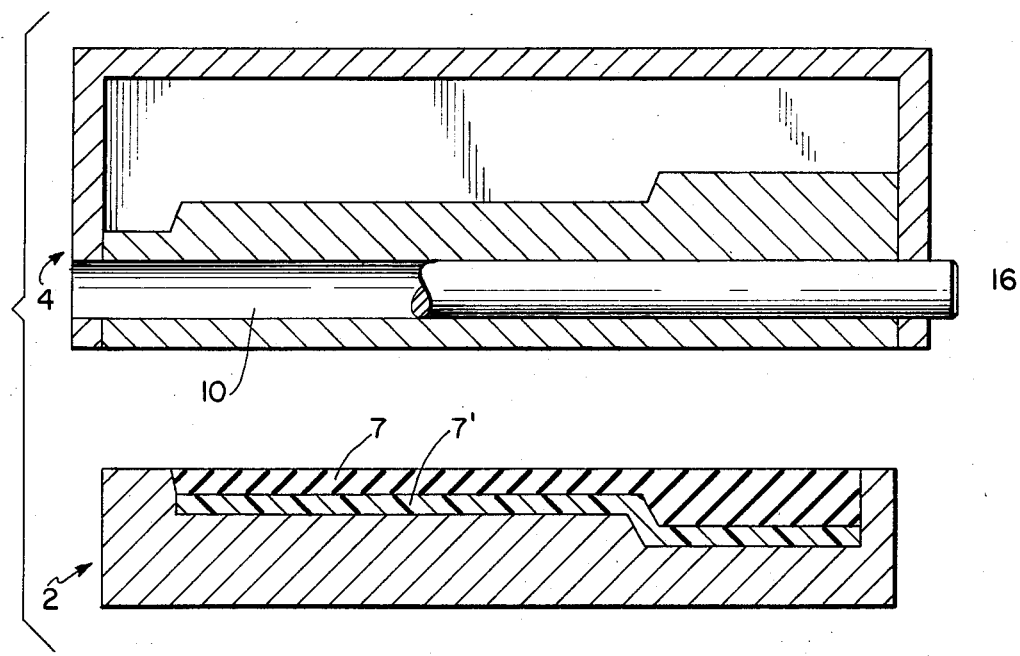
FIG. 10 is a cross-sectional view of yet another embodiment of the shoe mold device of the invention.

With reference to FIGS. 1, 4 and 10, the shoe mold device of the present invention is generally comprised of a lower mold portion 2 and an upper mold portion 4. The lower mold portion 2 serves as a base mold and includes a cavity 6 appropriately shaped according to the desired final form of the shoe sole to be manufactured. The cavity 6 is thus formed having various design features such as tread design, heel design, and instep shape. In manufacture the cavity 6 will receive the resin or rubber material 7, 7' of which the sole is to be comprised and will thus serve as the base and holding compartment for the shoe sole as the various layers are prepared in succession. The device of the invention can be utilized in various molding operations including compression molding, injection molding, and open pour molding with a variety of shoe sole compositions such as thermoplastic, thermosetting, or vulcanizable materials or other settable or moldable materials.

Figure 2:
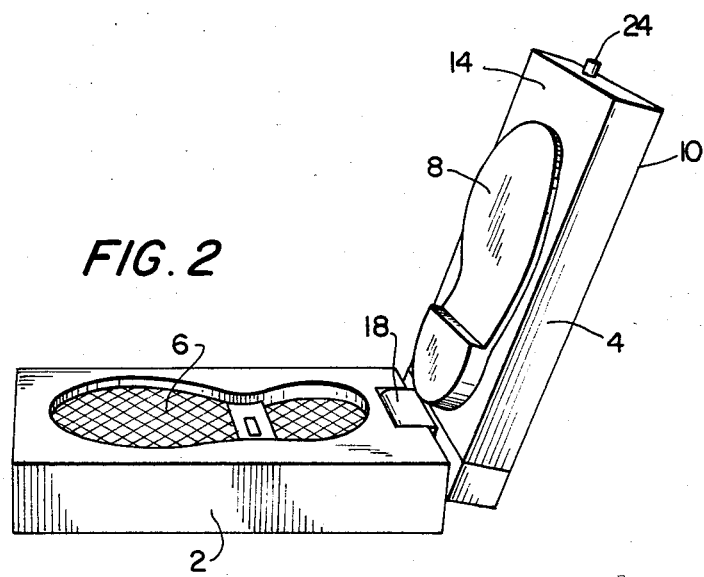
FIG. 2 is a side elevational view of the shoe mold device of the invention.
Figure 3:
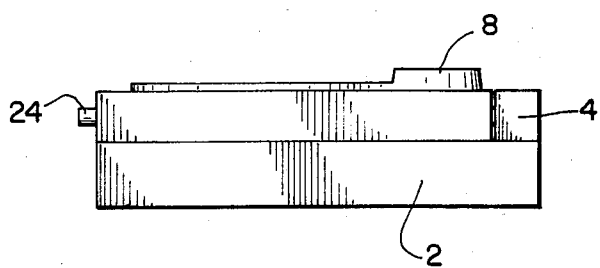
FIG. 3 is a side elevational view of the shoe mold device of the invention in a closed position.

Upper mold portion 4 serves as the top mold to be closed against lower mold portion 2. As shown in FIGS. 1-3, upper mold portion 4 may be designed to fold against lower mold portion 2 by a hinge or similar construction. However, the mold apparatus of the invention can also be utilized with various types of shoe sole manufacturing systems for providing the necessary manipulation of the mold as well as any required heat or pressure. In these systems, as shown for example in FIG. 10, upper mold portion 4 need not be hinged to the lower mold portion but, rather, may be associated with an arm or other mechanism (not shown) for providing the vertical movement necessary to open or close upper mold portion 4 with respect to the lower mold portion, as well as to rotate upper portion 4 to utilize the different mold surfaces as described hereinafter. This type of system is particularly useful in injection molding procedures because the device is more resistant to internal pressures within the mold due to the action of the arm or other mechanism operating the upper mold portion 4.

In either situation, upper mold portion 4 is importantly designed so as to contain at least two different mold surfaces for closing against lower mold portion 2. For example, in the device shown in FIGS. 1-3, one side of upper mold portion 4 contains a raised sole mold surface 8 on one side thereof and, on the other side, contains a substantially flat mold surface. Thus, in manufacture, a first layer of shoe sole material is poured or otherwise introduced into cavity 6 and the upper mold portion 4 is closed against lower mold portion 2 with the raised sole mold surface 8 being forced into cavity 6. After formation of this first sole layer, upper mold portion 4 is raised and rotated as described hereinbelow so that the substantially flat mold surface 10 can be closed against the lower mold portion. The final layer of sole material is then poured into cavity 6 up to the desired level and the upper mold portion 4 is closed against lower mold portion 2 to form the final shape of the sole, as best shown in FIG. 3.

The shoe mold device of the present invention is importantly designed so as to permit the upper mold portion 4 to be manipulated for closing various different mold surfaces against the lower mold portion 2. Thus, as shown in FIG. 4, upper mold portion 4 includes a base portion 12 and a mold surface portion 14 which are rotatably connected by means of rotation rod 16 passing therethrough. Base portion 12 of the upper mold portion 4 is hingedly connected to lower mold portion 2 by means of a hinge 18 including hinge pin 20 passing therethrough and rotatable within holes 22 in the lower mold portion 2. Hinge 18 is preferably manufactured as a unitary construction with base portion 12 by molding or casting the two portions together. This construction advantageously provides a tight fit between the upper and lower mold portions and reduces the movement or play inherent in other hinge constructions especially as experienced when pressure is applied to the device. Alternatively, hinge 18 is manufactured in a unitary construction with lower mold portion 2 with holes 22 being in base portion 12.

Thus, as best shown in FIGS. 1 and 2, upper mold portion 4 is opened or closed against lower mold portion 2 by grasping the handle 24 with either a hand or machine and raising or lowering the entire upper mold portion 4. Once open, upper mold portion 4 can be rotated about rotation rod 16 in order to position the desired mold surface portion of the upper mold. Again, as discussed above, top mold portion 4 need not be hingedly connected to lower mold portion 2, but, rather, may be associated with other machine systems to provide the manipulation necessary to rotate and close with respect to lower mold portion 2.

Although FIGS. 1 and 2 show the device of the invention having two mold surfaces, it will be recognized that an upper mold portion 4 rotatable with respect to lower mold portion 2 and having any number of mold surfaces can also be constructed and utilized in the device of the invention. For example, FIG. 4 shows such a device having three different mold surfaces having one lower mold portion 2 and three upper mold portions 4' and which are rotatable about an axis 26 in substantially the center thereof. In this manner, various upper mold portions 4 can be conceived and constructed having a variety of different mold surfaces to provide any desired shape for a particular layer within the shoe sole to be manufactured.

In use, shoe soles having different colored layers can be manufactured by alternately pouring different colored sole compositions into the cavity 6 and then closing the mold with a specifically chosen upper mold surface according to the desired shape and thickness of that layer. Shoe soles having outer layers which are resistant to wear and therefore longer lasting can also be prepared with the device of the invention by first pouring a dense or otherwise resistant outer layer material into cavity 6 and then closing the device with the desired upper mold portion surface. Subsequently, a softer more comfortable final layer, or intermediate layers if desired, can be prepared by pouring expandable cellular materials into the cavity 6 and then closing the upper mold portion 4 after selectively choosing the desired mold surface portion 14.

The device of the invention can also be utilized for direct attach molding wherein the final sole layer is pressed against and adhered to the shoe top. For this type of construction, one of the mold surface portions 14 of the upper mold portion 4 is constructed for attachment to the upper part of a shoe. When the final innermost layer of sole material is poured into cavity 6, the mold surface portion 14 having attached thereto the upper portion of the shoe is then pressed against the lower mold portion 2 and into the cavity 6, whereby the sole material in its hardening process adheres to the shoe top in a direct attach molding process.

Figure 6:
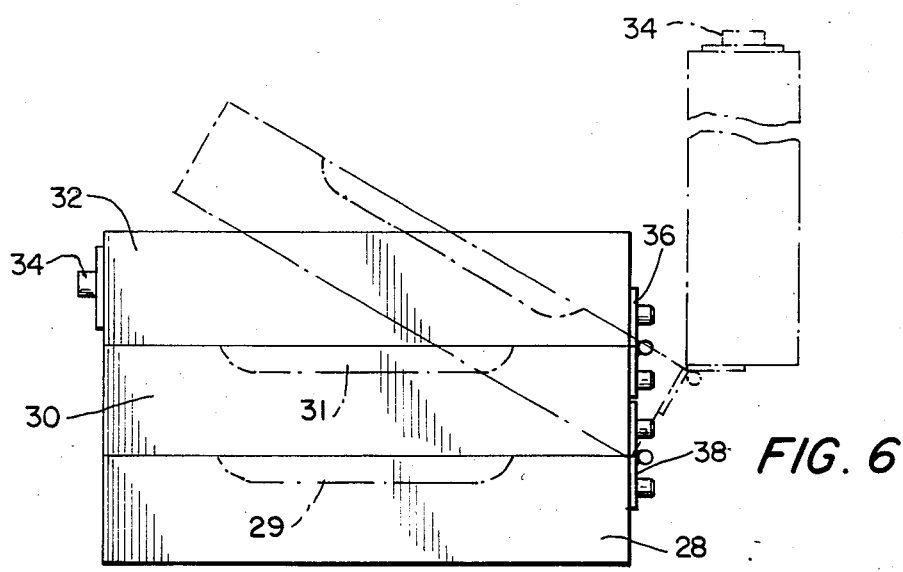
FIG. 6 is a side elevational view of another embodiment of the shoe mold device according to the invention wherein the solid lines show the device in the closed position and the broken lines show the device in an open position.

Another embodiment of the present invention as shown in FIG. 6 permits the manufacture of two shoe soles, usually a corresponding right and left shoe sole, at a single station. In this embodiment, the base mold 28 contains at its upper surface a cavity 29 for receiving shoe sole material and for formation of the shoe sole. The middle mold 30 is constructed on its bottom surface with the desired mold surface so as to serve as a top mold surface to be closed against the base mold 28. The top of middle mold 30 is then also constructed to contain a second cavity 31 for formation of a second shoe sole and upper mold 32 serves as the lid for closing against middle mold 30 to form the second shoe sole.

In use, the embodiment of FIG. 6 is moved to the open position as shown in dotted lines by grasping, either by machine or hand, the handle 34 and lifting upper mold 32 and middle mold 30 which open against hinges 36 and 38 which connect adjacent molds. The desired shoe sole material is poured into the cavity in the base mold 28 and middle mold 30 is moved downwardly to close against lowermold portion 28 for the formation of the first shoe sole. The desired shoe sole material is then poured into the cavity in the upper surface of middle mold 30 and upper mold 32 is then closed against the middle mold in order to form the second shoe sole.

Figure 7:
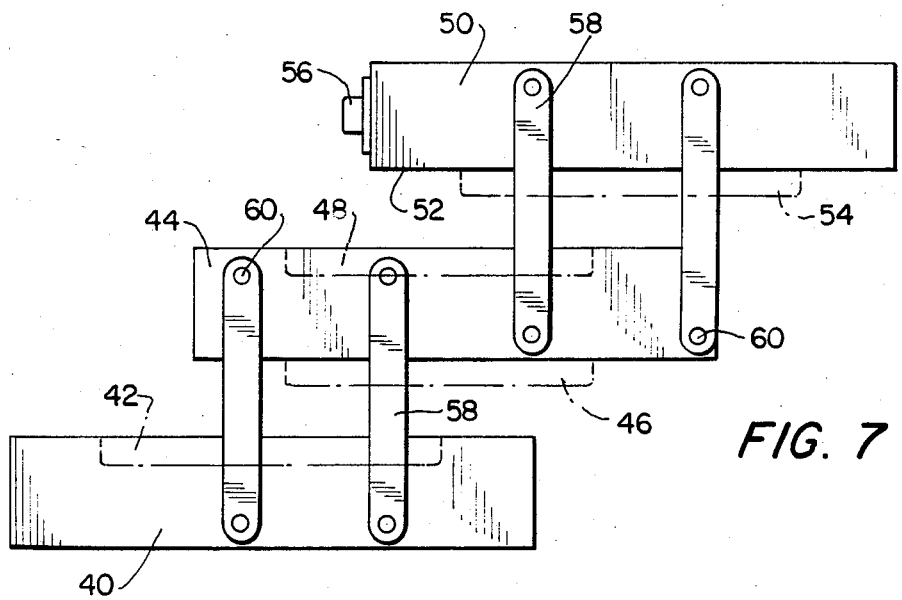
FIG. 7 is a side elevational view of another embodiment of the shoe mold device of the invention with a portion in phantom and in the open position.
Figure 8:
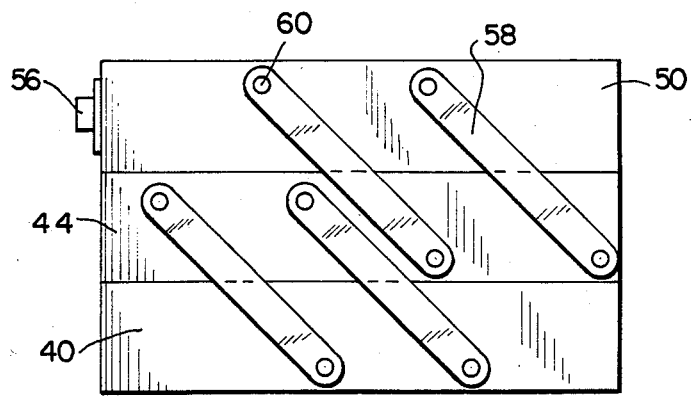
FIG. 8 is a side elevational view of the shoe mold device of FIG. 7 in a closed position.

FIGS. 7 and 8 show another embodiment of the present invention also permitting the manufacture of two different shoe soles, preferably a left and right shoe sole, at a single station. This embodiment also permits the rapid closing of a shoe mold cavity which is especially important when utilizing fast setting materials. In this embodiment, base mold 40 contains a cavity 42 in the upper surface thereof as shown in phantom lines in FIG. 7. Cavity 42 then serves as the cavity for the first shoe sole. Middle mold 44 having a mold surface of any desired shape, including various surface design projections 46 as shown in phantom lines, is provided to close against the base mold 40 and close the cavity 42. For formation of a second shoe sole, middle mold 44 also includes a cavity 48 in the upper surface thereof, as shown in phantom lines, for receiving sole material for the second shoe sole. Upper mold 50 including various mold surfaces on the lower surface 52 thereof, including projections 54 of various shapes, is provided for closing against middle mold 44 to complete the second shoe mold. Upper mold 50 also includes a handle 56 for operation of the mold device.

Adjacent molds are connected by means of hinge links 58, preferably a pair of hinges on each side of the molds, which are pivotally secured to the molds at hinge points 60. The hinges 58 permit the middle and upper molds to be closed against the underlying molds while always remaining in a parallel relationship to each other. Use of hinge links 58 also permits the molds to be rapidly closed which is important when utilizing fast setting resin materials and the like.

In use, a first shoe sole is prepared by pouring the desired sole composition material into cavity 42 and then closing this cavity by lowering middle mold 44 against the lower mold 40. Because of the hinge construction of the device, middle mold 44 can be closed against lower mold 40 while, at the same time, upper mold 50 is maintained in its open position relative to middle mold 44. After the first shoe sole is prepared in cavity 42, the desired shoe sole composition can then be poured into cavity 48 in middle mold 44 and upper mold 50 and quickly closed against middle mold 44, as shown in FIG. 8.

Thus, the embodiments shown in FIGS. 6–8 permit the manufacture of both a left and right shoe mold at a single station requiring less manufacturing space than required by present shoe mold apparatuses. It will also be recognized that the cavities and mold surfaces in the respective mold portions can be varied depending upon the desired shape or design characteristics desired in the sole to be manufactured.

Figure 9:
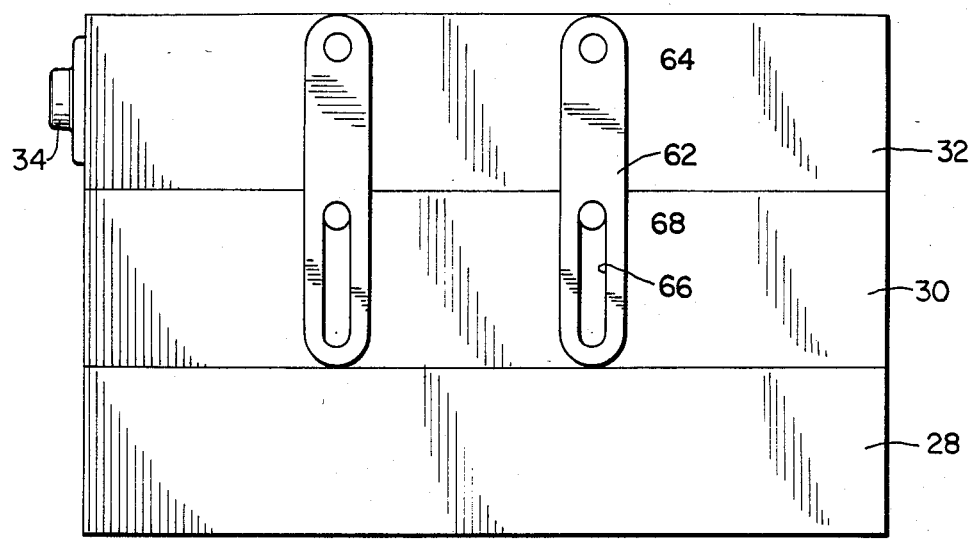
FIG. 9 is a side elevational view of another embodiment of the shoe mold device of the invention in a closed position.

FIG. 9 shows another embodiment of the present invention, similar to the embodiment of FIG. 6 but having a different hinge mechanism. The base mold 28, middle mold 30 and upper mold 32 are constructed as in the FIG. 6 embodiment with the appropriate cavities and mold surfaces. The embodiment of FIG. 9 includes links 62 which are fixed at one end at point 64 on the upper mold 32 and have a slotted portion 66 at the other end thereof. Middle mold 30 includes pin means 68 positioned within the slotted portions 66 to serve as a stop means for the vertical movements of the mold portions.

In use, the mold device of FIG. 9 is associated with a machine mechanism to provide the action necessary to vertically move the mold portions. Specifically, the device is opened by vertically lifting upper mold 32 until pin means 68 abuts the lower end of slotted portion 66. Continual vertical movement will then also open lower mold portion 28. The desired shoe sole material is then poured into the appropriate cavities and the mold portions moved vertically downward until pin means 68 abuts the upper end of slotted portion 66, whereby the device is closed to form the desired shoe soles.

The invention being thus decribed, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A shoe mold comprising: a first mold means for providing a first mold cavity for a first shoe sole;
    a second mold means for providing a cover for said first mold means and for providing a second mold cavity for a second shoe sole;
    a third mold means for providing a cover for said second mold cavity;
    said second mold means being cooperatively associated with said first mold means for closing against said first mold means; and
    said third mold means being cooperatively associated with said second mold means for closing against said second mold means, wherein said second mold means is operatively secured to said first mold means for permitting lateral and vertical movement of said second mold means relative to said first mold means, said third mold means is operatively secured to said second mold means for permitting lateral and vertical movement of said third mold means relative to said second mold means independent of the movement of said second mold means relative to said first mold means and securing means such as to permit said mold means to occupy spaced apart positions with facing spaced sides substantially parallel.

2. A shoe mold as in claim 1, wherein said second mold means is hingedly associated to said first mold means by at least a first pair of spaced apart hinge links, a first end of said first pair of hinge links being pivotally associated with said first mold means and a second end of said first pair of hinge links being pivotally associated with said second mold means, and said third mold means is hingedly associated to said second mold means by at least a second pair of spaced apart hinge links, a first end of said second pair of hinge links being pivotally associated with said second mold means and a second end of said second pair of hinge links being pivotally associated with said third mold means.

* * * * *